US006191942B1

(12) United States Patent
Lee et al.

(10) Patent No.: US 6,191,942 B1
(45) Date of Patent: Feb. 20, 2001

(54) PORTABLE COMPUTER

(75) Inventors: Chuan-Yuan Lee; Hui-Lian Chang; Yuan Ming, all of Taipei (TW)

(73) Assignee: Compal Electronics, Inc. (TW)

(*) Notice: Under 35 U.S.C. 154(b), the term of this patent shall be extended for 0 days.

(21) Appl. No.: 09/337,532

(22) Filed: Jun. 22, 1999

(51) Int. Cl.[7] ................................. G06F 1/16; H05F 5/02
(52) U.S. Cl. ............................ 361/683; 345/905; 381/87; 381/388
(58) Field of Search ...................... 361/681, 683, 361/682, 686, 724, 727; 353/119, 120, 122; 345/169, 905; 248/917, 924; 381/87–88, 385–387, 388, 333; 181/141, 150, 199

(56) References Cited

U.S. PATENT DOCUMENTS

| 5,321,760 | * | 6/1994  | Gray           | 381/86    |
| 5,610,992 | * | 3/1997  | Hickman        | 381/188   |
| 5,668,882 | * | 9/1997  | Hickman et al. | 381/24    |
| 5,675,426 | * | 10/1997 | Meisner et al. | 358/838   |
| 5,799,068 | * | 8/1998  | Kikinis et al. | 379/93.06 |
| 5,812,369 | * | 9/1998  | Hsu et al.     | 361/683   |
| 5,825,614 | * | 10/1998 | Kim            | 361/683   |
| 5,838,537 | * | 11/1998 | Lundgren et al.| 361/683   |
| 5,852,545 | * | 12/1998 | Pan-Ratzlaff   | 361/683   |
| 5,880,928 | * | 3/1999  | Ma             | 361/683   |
| 5,917,695 | * | 6/1999  | Youn           | 361/683   |
| 6,040,978 | * | 3/2000  | Spencer        | 361/683   |
| 6,043,976 | * | 3/2000  | Su             | 361/686   |
| 6,052,275 | * | 4/2000  | Joseph         | 361/683   |
| 6,078,497 | * | 6/2000  | Derocher et al.| 361/683   |
| 6,081,421 | * | 6/2000  | Markow et al.  | 361/683   |

FOREIGN PATENT DOCUMENTS

| 10-74119 | * | 3/1998 | (JP) | G06F/1/16 |
| 11-53056 | * | 2/1999 | (JP) | G06F/1/16 |

* cited by examiner

Primary Examiner—Leo P. Picard
Assistant Examiner—Anatoly Vortman
(74) Attorney, Agent, or Firm—Pillsbury Madison & Sutro LLP

(57) ABSTRACT

A portable computer can detachably receive a loudspeaker module which includes front and rear walls, a guided wall interposed therebetween, a loudspeaker unit disposed therein, and a connecting member disposed to extend rearwardly and outwardly of the rear wall and connected electrically to the loudspeaker unit. The portable computer includes a mainframe module having upper and lower major walls, a keyboard disposed in the upper major wall, first and second side walls respectively interposed between the upper and lower major walls, a guiding wall, and a mating connecting member. The first side wall defines a receiving cavity extending towards the second side wall and terminating at an inner abutment wall which is spaced apart from the first side wall. The guiding wall is disposed to bound the receiving cavity, and guides slidably the guided wall so as to bring the rear wall towards the inner abutment wall. The mating connecting member forms together with the connecting member, a male-and-female connector assembly. The mating connecting member disposed to extend forwardly and inwardly of the inner abutment wall, and is adapted to register with and to fit matingly and snugly with the connecting member when the rear wall is slidably guided by the guiding wall to push against the inner abutment wall.

6 Claims, 6 Drawing Sheets

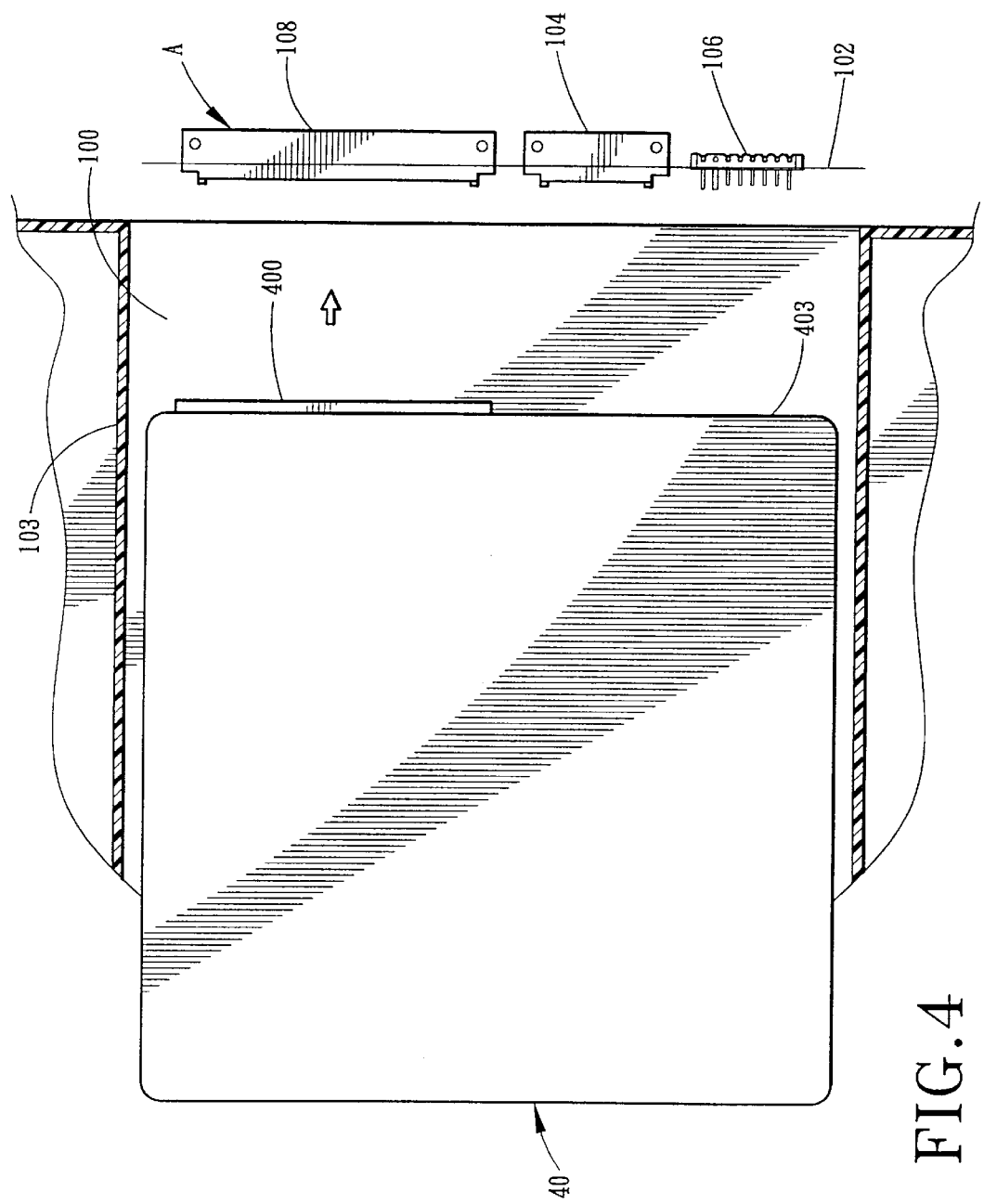

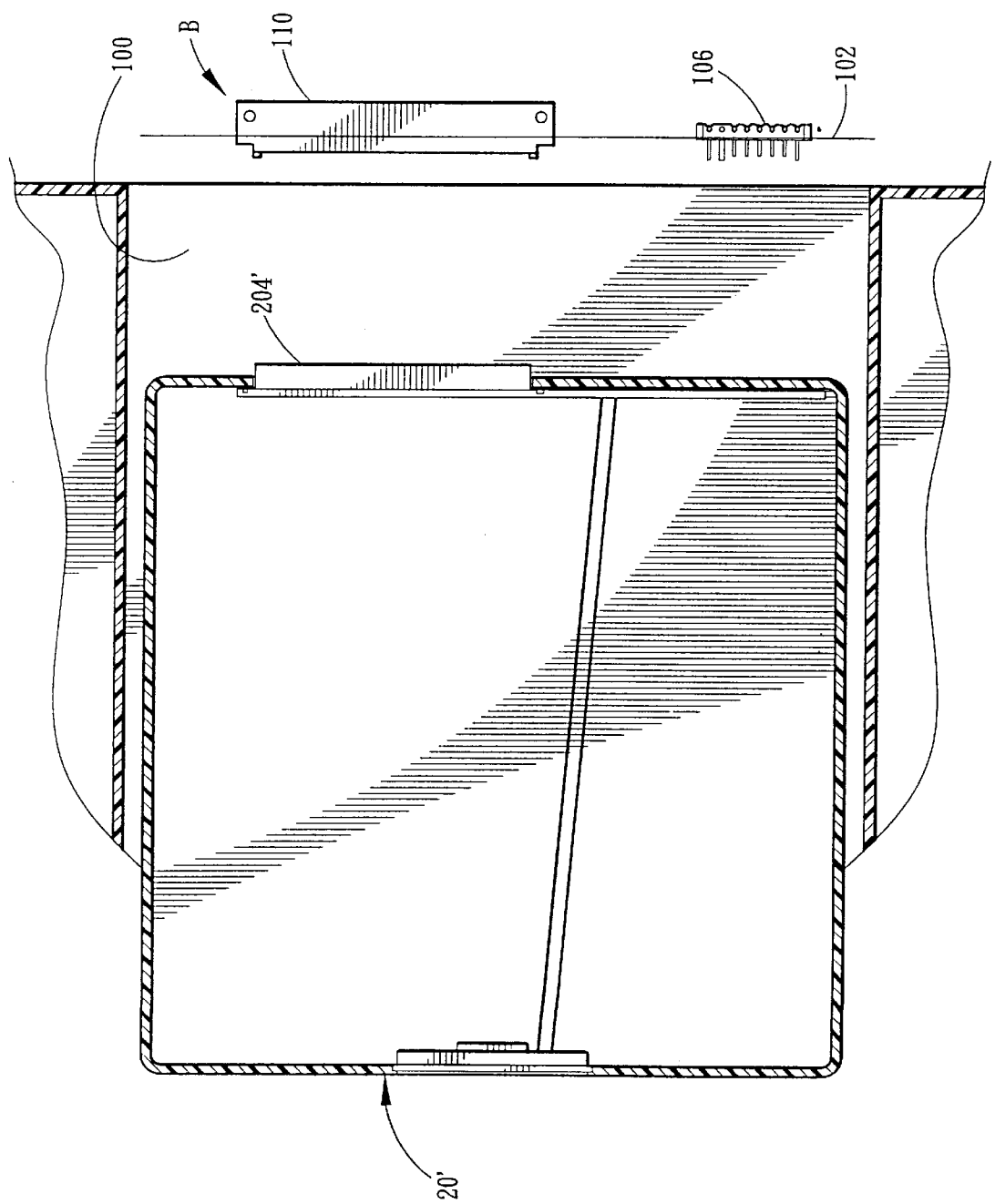

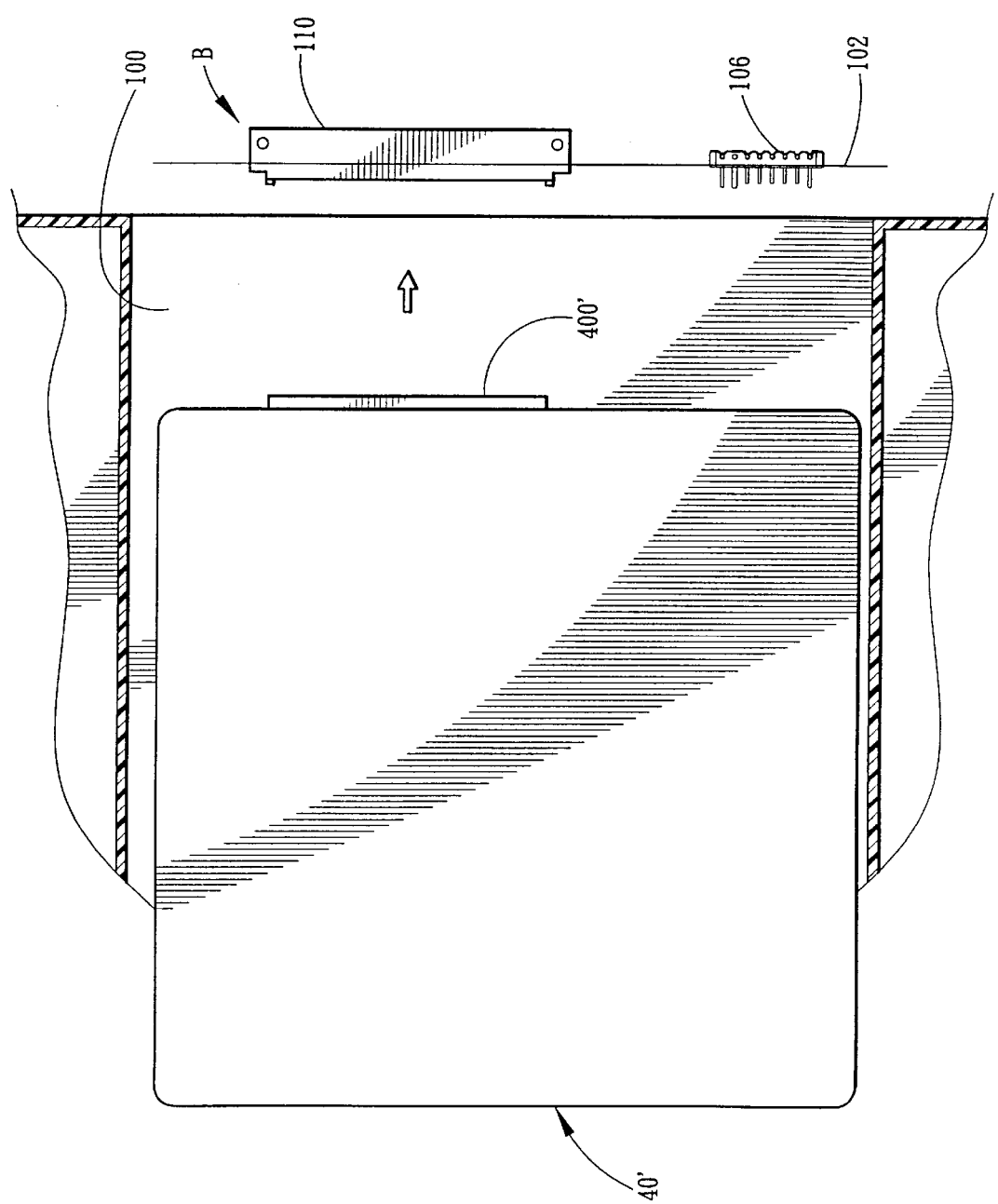

PORTABLE COMPUTER

BACKGROUND OF THE INVENTION

1. Field of the Invention

The invention relates to a portable computer, more particularly to a portable computer which can detachably receive a loudspeaker module.

2. Description of the Related Art

A conventional portable computer usually has the tweeter and/or woofer loudspeaker units integral therewith. The following are some of the drawbacks of the conventional portable computer:

1. The loudspeaker units are fixed to the portable computer and cannot be replaced by other kinds of loudspeaker units.
2. The sound effect provided by the loudspeaker units is poor since the resonating space of the loudspeaker mechanism is limited by the interior of the portable computer.

SUMMARY OF THE INVENTION

Therefore, the main object of the present invention is to provide a portable computer that is adapted for use with a detachable loudspeaker module.

Another object of the present invention is to provide a portable computer that is adapted to detachably receive a selected one of a loudspeaker module, a battery module and a disk drive module.

According to the present invention, a portable computer is adapted to detachably receive a loudspeaker module which includes front and rear walls opposite to each other in a first longitudinal direction, a guided wall interposed therebetween, a loudspeaker unit disposed therein and proximate to the front wall to deliver transduced sound therethrough, and a connecting member of a male-and-female electrical connector assembly disposed to extend rearwardly and outwardly of the rear wall, and connected electrically to the loudspeaker unit. The portable computer comprises a mainframe module.

The mainframe module includes upper and lower major walls, a keyboard, first and second side walls, a guiding wall and a mating connecting member. The upper and lower major walls are opposite to each other in a first transverse direction. The keyboard is disposed on the upper major wall. The first and second side walls are respectively interposed between the upper and lower major walls, and are opposite to each other in a second longitudinal direction transverse to the first transverse direction. The first side wall defines a receiving cavity extending towards the second side wall in the second longitudinal direction and terminating at an inner abutment wall which is spaced apart from the first side wall in the second longitudinal direction. The guiding wall is disposed to bound the receiving cavity in the second longitudinal direction, and is adapted to slidably guide the guided wall so as to bring the first longitudinal direction to be aligned with the second longitudinal direction and to bring the rear wall towards the inner abutment wall. The mating connecting member is adapted to form together with the first connecting member, the male-and-female electrical connector assembly. The first mating connecting member is disposed to extend forwardly and inwardly of the inner abutment wall, and is adapted to register with and to fit matingly and snugly with the connecting member when the rear wall is slidably guided by the guiding wall to push against the inner abutment wall.

BRIEF DESCRIPTION OF THE DRAWINGS

Other features and advantages of the present invention will become apparent in the following detailed description of the preferred embodiments with reference to the accompanying drawings, of which:

FIG. 4 is a fragmentary schematic sectional top view showing the first preferred embodiment when used with a disk drive module;

FIG. 5 is a fragmentary schematic sectional top view showing a second preferred embodiment of this invention with another loudspeaker module; and FIG. 6 is a fragmentary schematic sectional top view showing the second preferred embodiment with another disk drive module.

DETAILED DESCRIPTION OF THE PREFERRED EMBODIMENTS

Figure 1:
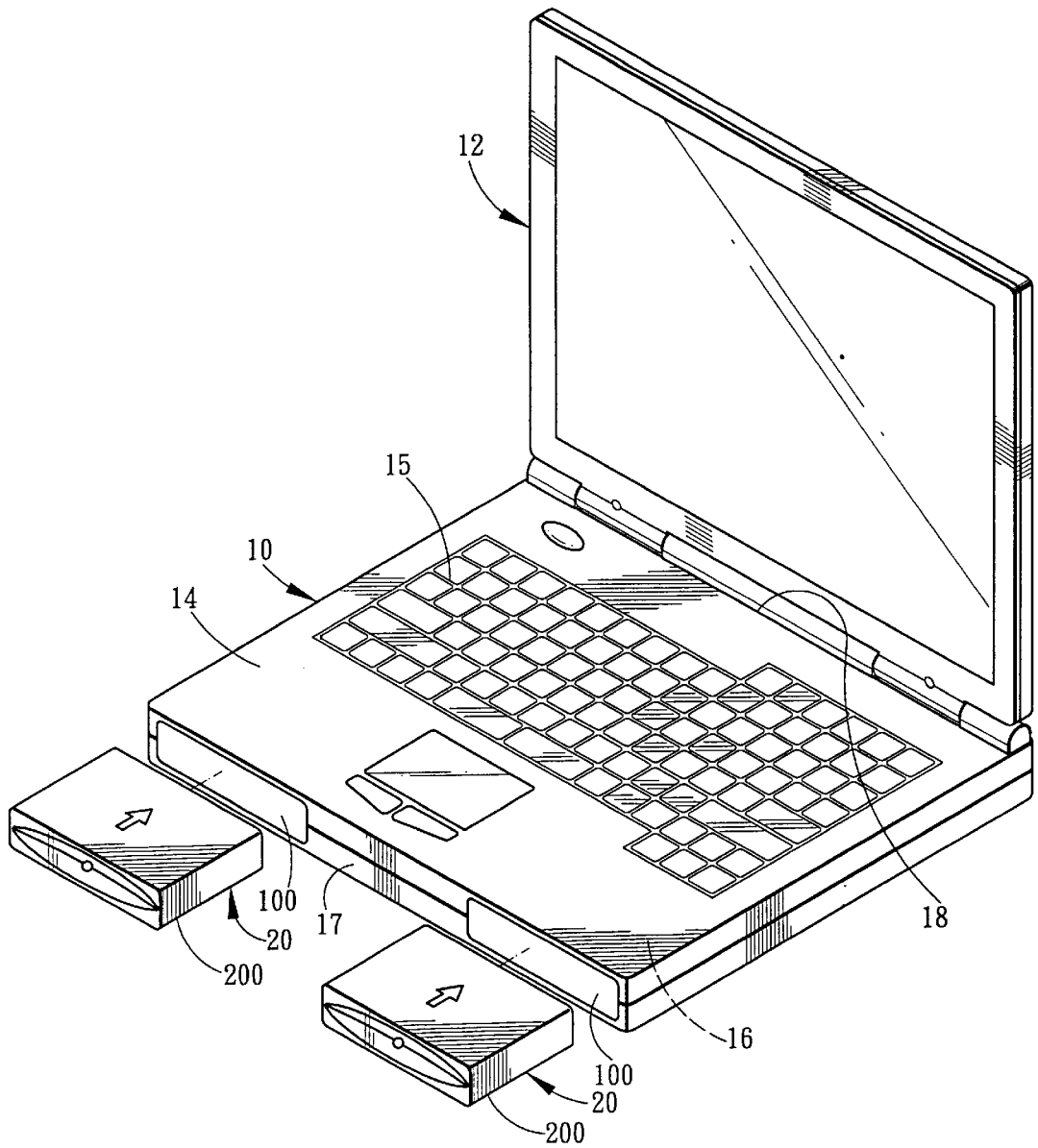
FIG. 1 is a perspective schematic view illustrating a first preferred embodiment of a portable computer of this invention with two loudspeaker modules.

Before the present invention is described in greater detail, it should be noted that like elements are denoted by the same reference numerals throughout the disclosure.

Referring to FIGS. 1 to 4, according to the first preferred embodiment, a portable computer is shown to detachably receive two loudspeaker modules 20. Each loudspeaker module 20 includes front and rear walls 201, 203 opposite to each other in a first longitudinal direction, a guided wall 200 interposed between the front and rear walls 201, 203, a loudspeaker unit 202 disposed therein and proximate to the front wall 201 to deliver transduced sound therethrough, and a male loudspeaker connecting member 204 disposed on a circuit board 206 which is mounted on the rear wall 203 in the loudspeaker module 20, and extending rearwardly and outwardly of the rear wall 203. The connecting member 204 is electrically connected to the loudspeaker unit 202 by use of a wire 208 connected between the loudspeaker mechanism 202 and the circuit board 206.

The portable computer includes a mainframe module 10 and a display module 12.

Figure 2:
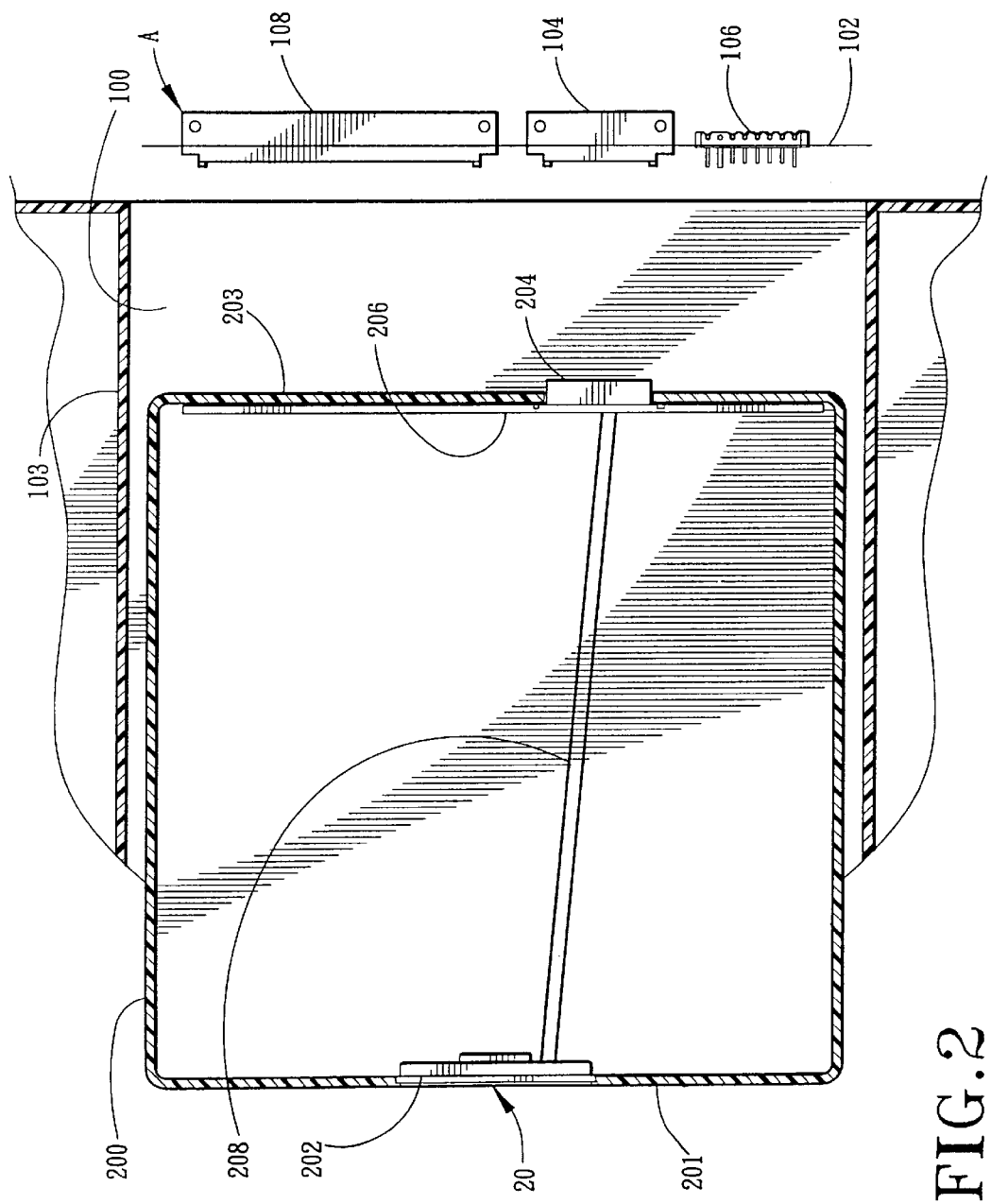
FIG. 2 is a fragmentary schematic sectional top view showing one of the loudspeaker modules inserted into the portable computer in FIG. 1.

The mainframe module 10 includes upper and lower walls 14, 16, a keyboard 15 disposed on the upper major wall 14, front and rear side walls 17, 18, a motherboard disposed in the mainframe module 10, a guiding wall 103, and a female mating connecting member (A). The upper and lower major walls 14, 16 are opposite to each other in a first transverse direction. The front and rear side walls 17, 18 are respectively interposed between the upper and lower major walls 14, 16, and are opposite to each other in a second longitudinal direction transverse to the transverse direction. The rear side wall 18 is hingedly connected to the display module 12 so that the display module 12 is foldable towards the upper major wall 14. The front side wall 17 defines two receiving cavities 100. Each receiving cavity 100 extends towards the rear side wall 18 in the second longitudinal direction, and terminates at an inner abutment wall 102, which is provided on a front edge of the motherboard distal to the rear side wall 18, in the second longitudinal direction. The guiding wall 103 is disposed to bound the receiving cavity 100 in the longitudinal direction, and is adapted to slidably guide the guided wall 200 so as to bring the first direction to be aligned with the second longitudinal direction and to bring the rear wall 203 towards the inner abutment wall 102. The female mating connecting member has a loudspeaker mating connecting unit 104, a battery mating connecting unit 106 and a disk drive mating connecting unit 108 which are disposed in a second transverse direction. The loudspeaker mating connecting unit 104 is disposed between the battery mating connecting unit 106 and the disk drive mating connecting unit 108. The loudspeaker mating connecting unit 104 can form a loudspeaker male-and-female electrical connector assembly together with the male loudspeaker connecting member 204. The loudspeaker mating connecting unit 104 is disposed to extend forwardly and inwardly of the inner abutment wall 102. The loudspeaker mating connecting unit 104 registers with, and fits matingly and snugly with the male loudspeaker connecting member 204 when the rear wall 203 is slidably guided by the guiding wall 103 to push against the inner abutment wall 102, as shown in FIG. 2. Therefore, the loudspeaker module 20 has an adequate resonating space for the loudspeaker unit 202 to generate a good sound effect.

In this embodiment, another loudspeaker module with tweeter, midrange, woofer or subwoofer loudspeaker units can replace the loudspeaker module 20 so as to provide a desired sound output.

Figure 3:
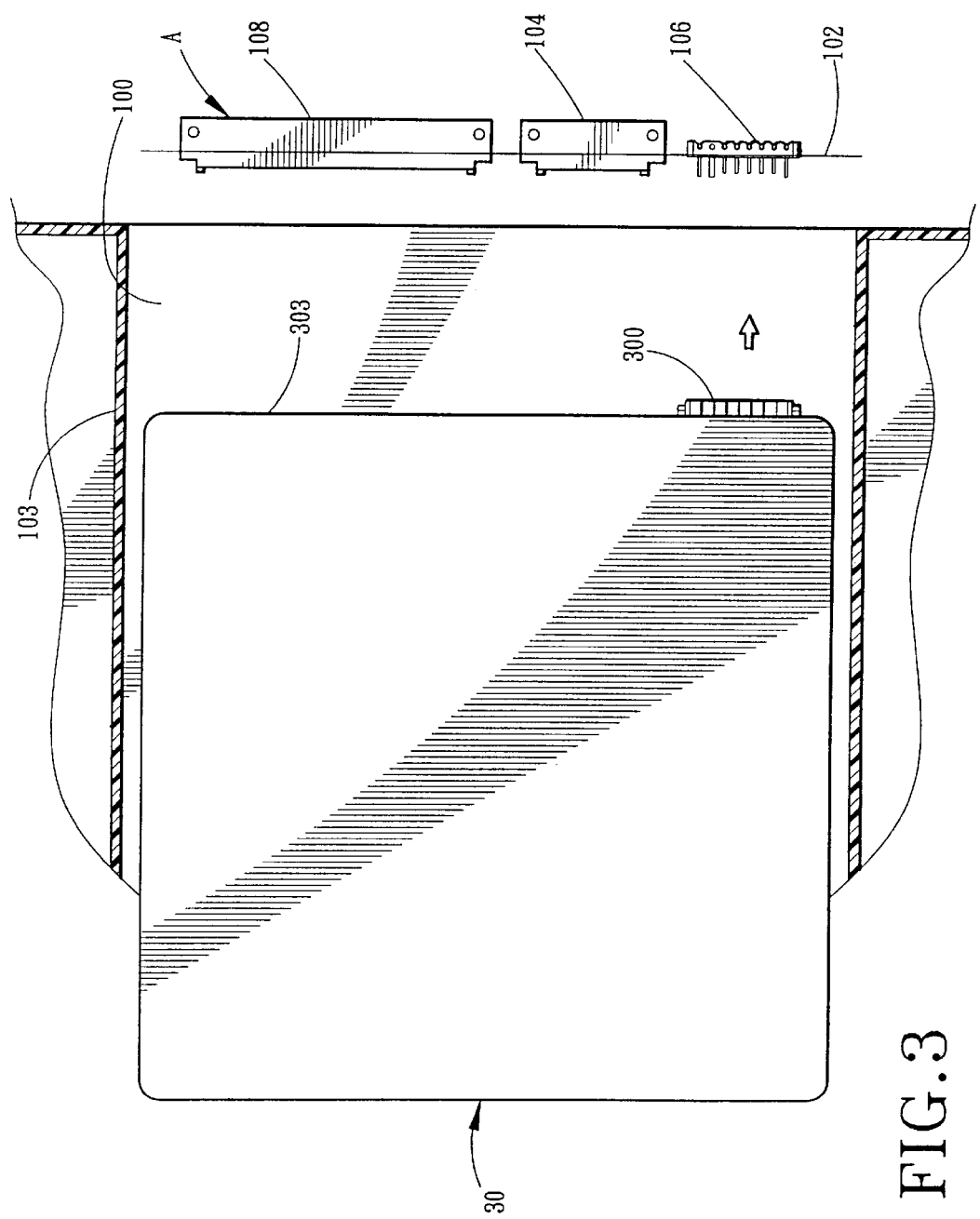
FIG. 3 is a fragmentary schematic sectional top view showing the first preferred embodiment when used with a battery module.

Further, in FIG. 3, a battery module 30 has a rear wall 303 provided with a battery male connecting member 300 corresponding to the battery mating connecting unit 106. The battery mating connecting unit 106 can form a battery male-and-female electrical connector assembly together with the male battery connecting member 300. The battery mating connecting unit 106 is disposed to extend forwardly and inwardly of the inner abutment 102. The battery mating connecting unit 106 registers with, and fits matingly and snugly with the male battery connecting member 300 when the rear wall 303 is pushed against the inner abutment wall 102, when the loudspeaker module 20 is removed from the receiving cavity 100, and the battery module 30 is received in place of the loudspeaker module 20.

Furthermore, in FIG. 4, a disk drive module 40, such as a floppy, hard or compact disk drive module, has a rear wall 403 provided with a disk drive male connecting member 400 corresponding to the disk drive mating connecting unit 108. The disk drive mating connecting unit 108 can form a disk drive male-and-female electrical connector assembly together with the male battery connecting member 400. The disk drive mating connecting unit 108 is disposed to extend forwardly and inwardly of the inner abutment wall 102. The disk drive mating connecting unit 108 registers with, and fits matingly and snugly with the male disk drive connecting member 400 when the rear wall 403 is pushed against the inner abutment wall 102, when the battery module 30 is removed from the receiving cavity 100, and the disk drive module 40 is received in place of the battery module 30.

FIGS. 5 and 6 illustrate the second preferred embodiment, which is based on the first preferred embodiment. Unlike the first preferred embodiment shown in FIG. 2, the female mating connecting member (B) includes a single mating connecting unit 110 combined with the loudspeaker mating connecting unit and the disk drive mating connecting unit, and the battery mating connecting unit 106. A loudspeaker module 20' formed with a loudspeaker male connecting member 204', and a disk drive module 40' formed with a disk drive male connecting member 400' can be selectively inserted into the receiving cavity 100.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A portable computer adapted to detachably receive a loudspeaker module which includes: front and rear walls opposite to each other in a first longitudinal direction; a guided wall interposed therebetween; a loudspeaker unit disposed therein and proximate to the front wall to deliver transduced sound therethrough; and a first connecting member of a first male-and-female electrical connector assembly disposed to extend rearwardly and outwardly of the rear wall, and connected electrically to the loudspeaker unit, said portable computer comprising:

a mainframe module including
upper and lower major walls opposite to each other in a first transverse direction;
a keyboard disposed on said upper major wall;
first and second side walls respectively interposed between said upper and lower major walls, and opposite to each other in a second longitudinal direction transverse to said first transverse direction, said first side wall defining a receiving cavity extending towards said second side wall in said second longitudinal direction and terminating at an inner abutment wall which is spaced apart from said first side wall in said second longitudinal direction;
a guiding wall disposed to bound said receiving cavity in said second longitudinal direction and adapted to slidably guide the guided wall so as to bring the first longitudinal direction to be aligned with said second longitudinal direction and to bring the rear wall towards said inner abutment wall; and
a first mating connecting member adapted to form together with the first connecting member, the first male-and-female electrical connector assembly, said first mating connector member being disposed to extend forwardly and inwardly of said inner abutment wall, and being adapted to register with and to fit matingly and snugly with the first connecting member when the rear wall is slidably guided by said guiding wall to push against said inner abutment wall.

2. The portable computer as claimed in claim 1, wherein said first side wall is a front side wall, and said second side wall is a rear side wall, the portable computer further comprising a display module hingedly connected to said rear side wall so as to be foldable towards said upper major wall.

3. The portable computer as claimed in claim 2, wherein said mainframe module includes therein a motherboard provided with a front edge distal to said rear side wall and serving as said inner abutment wall.

4. The portable computer as claimed in claim 2, further comprising a second mating connecting member disposed on said inner abutment wall and spaced apart from said first mating connecting member in a second transverse direction transverse to said second longitudinal direction, said second mating connecting member being adapted to form a second male-and-female electrical connector assembly together with a second connecting member disposed on a second rear wall of a battery module, and being adapted to register with and to fit matingly and snugly with the second connecting member when the second rear wall is slidably guided by said guiding wall to push against said inner abutment wall, when the loudspeaker module is removed from said receiving cavity, and the battery module is received in place of the loudspeaker module.

5. The portable computer as claimed in claim 4, further comprising a third mating connecting member disposed in said inner abutment wall and spaced apart from said first mating connecting member in said second transverse direction transverse to said second longitudinal direction, said third mating connecting member being adapted to form a third male-and-female electrical connector assembly together with a third connecting member disposed in a third rear wall of a disk drive module, and being adapted to register with and to fit matingly and snugly with the third connecting member when the third rear wall is slidably guided by said guiding wall to push against said inner abutment wall, when the loudspeaker module is removed from said receiving cavity, and the disk drive module is received in place of the loudspeaker module.

6. The portable computer as claimed in claim 5, wherein said third mating connecting member is formed integrally with said first mating connecting member so as to form a single-piece construction disposed on said inner abutment wall.

* * * * *